United States Patent [19]

Derbyshire

[11] 4,220,511

[45] Sep. 2, 1980

[54] TREATMENT OF SINTERED POLY-TETRAFLUOROETHYLENE WITH IRRADIATION AND HEAT TO PRODUCE A GRINDABLE MATERIAL

[75] Inventor: Rodney L. Derbyshire, Northport, N.Y.

[73] Assignee: Radiation Dynamics, Inc., Melville, N.Y.

[21] Appl. No.: 19,890

[22] Filed: Mar. 12, 1979

[51] Int. Cl.³ .............................................. C08F 2/46
[52] U.S. Cl. ................................. 204/159.2; 428/422; 528/481; 528/502; 528/503
[58] Field of Search ...................................... 204/159.2

[56] References Cited

U.S. PATENT DOCUMENTS

| | | | |
|---|---|---|---|
| 3,766,031 | 10/1973 | Dillon | 204/159.2 |
| 3,878,164 | 4/1975 | Lott | 260/42.27 |
| 4,029,870 | 6/1977 | Brown et al. | 526/255 |
| 4,036,718 | 7/1977 | Brown et al. | 204/159.2 |
| 4,052,278 | 10/1977 | Brown et al. | 204/159.2 |

Primary Examiner—Richard B. Turer
Attorney, Agent, or Firm—Howard L. Rose

[57] ABSTRACT

Sintered polytetrafluoroethylene is nondestructively degraded so as to be grindable to a powder of an average size of less than 10 microns by a combination of irradiation by electrons or other subatomic particles in the presence of oxygen or air and concurrent or subsequent heating at temperatures below the melting point of the material. The preferred effective and economic range of irradiation, heat and time at temperature is approximately 50–150 Mrads, 150° F. to 600° F. for at least about one-half hour depending upon desired average particle size and melt flow characteristics and acceptable yields of fine powders.

19 Claims, 7 Drawing Figures

MATERIAL A
EFFECT of POST IRRADIATION
HEAT TREATMENT ON MELT FLOW

FIG. 4

MATERIAL A
EFFECT of IRRADIATION and HEAT TREATMENT on AVERAGE PARTICLE SIZE

FIG. 3

MATERIAL B
EFFECT of POST IRRADIATION HEAT TREATMENT on MELT FLOW

FIG. 6
MATERIAL A
EFFECT of POST IRRADIATION HEAT TREATMENT on LARGE PARTICLES

FIG. 5
MATERIAL B
EFFECT of POST IRRADIATION HEAT TREATMENT on AVERAGE PARTICLE SIZE

TREATMENT OF SINTERED POLY-TETRAFLUOROETHYLENE WITH IRRADIATION AND HEAT TO PRODUCE A GRINDABLE MATERIAL

TECHNICAL FIELD

The present invention relates to processing of sintered polytetrafluoroethylene to render the material readily grindable to fine powders having low average particle size, 10 microns or less, and high melt flow characteristics.

Polytetrafluoroethylene powders having particle sizes of 10 microns or less have been used for some time as lubricants in such materials as printing inks and in various fabrication processes. The sources of such powders are the various manufacturers of the material at current costs of $4.00 to $5.00 per pound unfabricated. The material may also be produced from scrap unsintered polytetrafluoroethylene currently purchasable at about $1.50 per pound. Unsintered scrap material however, is in short supply because only a small proportion of polytetrafluoroethylene is fabricated in the unsintered form.

Sintered scrap polytetrafluoroethylene is in abundent supply at relatively low cost, currently about $0.40 per pound. However, the cost of converting sintered polytetrafluoroethylene into fine powder by prior art methods is prohibitive.

BACKGROUND ART

Sintered polytetrafluoroethylene is known to degrade under ionizing irradiation and is grindable into fine powders of commercial interest, but only after exposure to irradiation levels in excess of 200 Mrads. Polytetrafluoroethylene is also known to be extremely stable under conditions of long term heat aging. For example, polytetrafluoroethylene is suitable as electrical insulation for continuous use up to 550° F. (288° C.). Discussions of the degradation of polytetrafluoroethylene under irradiation have been in the literature for many years. (See Charlesby—Chapter 20 and Chapiro pages 526 through 533). After exposure to very low doses (~5 Mrads), unsintered polytetrafluoroethylene can lose many of its desirable mechanical properties, even though it retains its chemical properties and remains inert for all practical purposes.

Surprisingly it has been found that a combination of irradiation and heat significantly affects the degradation of sintered polytetrafluoroethylene. Under normal circumstances polytetrafluoroethylene which has been sintered (exposed for ~5 minutes at 800° F. or 427° C.) does not readily degrade under irradiation. However, either by concurrently irradiating and heating or by irradiating and then heating, it has been found that the levels of irradiation required to lower the molecular weight of polytetrafluoroethylene can be substantially reduced. This can be accomplished at temperatures significantly below the melt transition of polytetrafluoroethylene (342° C. or 648° F.) and at temperatures (i.e. <550° F. or 288° C.) where polytetrafluoroethylene is normally considered quite stable. Furthermore, the dose rates used in irradiating the polytetrafluoroethylene are those commonly experienced in using electron beam accelerators—e.g., ~1 Mrad/second.

Dillin, U.S. Pat. No. 3,766,031, has suggested that sintered polytetrafluoroethylene can be degraded by irradiation at dose levels in the ranges of from about 5 Mrads to 25 mrads with heating not to exceed 250° F. Experiments performed using such techniques failed to permit sintered polytetrafluoroethylene to be ground to particle sizes noted in the patent. In fact with doses of from 10-25 Mrads and temperatures from 213° F.-248° F. no powders were produced. Some coarse powder was produced when the upper irradiation level of the patent were exceeded by about 60%, but no powders were produced when the temperature range was exceeded but the irradiation was held within range.

DISCLOSURE OF INVENTION

According to the present invention sintered polytetrafluoroethylene is nondestructively degraded to a degree necessary to render it grindable to fine powders, 10 microns or less, by irradiating the material in the presence of air or oxygen in a range of 45 Mrads to 200 Mrads, heating, either during or subsequent to irradiation, to temperatures in the range of 150° F. to 600° F. for a period of at least about one-half hour and grinding. Surprisingly, it has been found that by utilizing a combination of irradiation, at doses normally considered low and heating in ranges at which polytetrafluoroethylene is normally stable, the levels of irradiation required to lower the molecular weight of polytetrafluoroethylene can be materially reduced to a level rendering the process commercially viable. It should be noted that the upper temperature limit is the melting temperature of the material and may exceed 600° F. by a small percentage.

The present invention is concerned with producing polytetrafluoroethylene powders capable of use as lubricants in inks and other commercial and industrial applications. Such powders must have a particle size of 10 microns or less and for purposes of this application such powders are referred to as "fine powders". Successful practice of the invention is achieved when fine powders are produced at costs that are economically competitive with other methods of producing such powders; a condition that could not be achieved prior to the present invention when using sintered polytetrafluoroethylene as the starting material.

It has been found that production of powders on a batch basis in accordance with the teachings of the present invention generally results in a material having a large proportion of fine powder, some coarse powder (above 10 microns) and some coarse material above, for instance, 60 microns.

In determining whether a particular process is successful when practiced on a batch basis, the economics of the situation must be considered as determined by the following factors; the cost of the new material, the cost of processing (irradiation, heating and grinding), and the yield which determines the total cost per pound of fine powder. As the economics of the industry changes the yields related to a "successful" process must as a practical matter, vary. At the present time a process of the present invention that yields a material with a mear particle size of 10 microns or less is considered eminently economically successful.

In commercial practice a continuous process will normally be employed. In such a process, it is envisioned that material will be spread on a conveyor, passed under an electron beam, concurrently and/or subsequently passed through an air circulating oven at a speed such that the material is subjected to the desired heat for the desired time period. The material thereafter will pass into a grinder, probably an air mill, and dispensed therefrom through an air stream that belows off the particles of 10 microns or less (for collection) while the remaining materials are collected and dispersed again or the conveyor with new scrap for additional irradiation, heating and grinding.

In the continuous processing case yields approaching 100% should be attained and an economic process is then determined by the yield per hour relative to total cost per hour.

Materials produced may have an average particle size of less than 10 microns, a high melt flow or intermediate combinations depending on details of the treatment. The higher the temperature the more readily the material grinds to fine powder with less coarse particles. The longer the heat treatment at somewhat lesser temperatures the higher the melt flow and lower the molecular weight. Thus, a balance must be struck depending upon desired final characteristics. For instance an average particle size of 6.1 microns and melt flow at 330° C. of 1079 was obtained with a dose of 90 Mrads and a temperature of 500° F. held for 2 hours. An average particle size of 9.6 microns and a melt flow of 2136 at 330° C. was obtained with a dose of 90 Mrads, and a temperature of 500° F. held for 5 hours.

As indicated, irradiation heating and grinding may be conducted concurrently or successively. In the later case heating should occur before material loss of peroxidized or free radical species of polytetrafluoroethylene formed during irradiation, a matter of hours at least.

DESCRIPTION OF THE PREFERRED EMBODIMENTS

In the following examples, solid sintered polytetrafluoroethylene scrap samples were exposed to electron beam radiation at beam acceleration voltage levels and dose rates as specified in each example.

EXAMPLE 1

A sample of 100 grams of scrap flakes from previously sintered polytetrafluoroethylene was placed in a grinding device capable of simultaneously shredding the polymer and aerating it. This device consisted of a container with a high speed cutting blade at its base (a blender). The container with the scrap polytetrafluoroethylene in it was placed directly under an 800 KeV, 50 microamp electrom beam which produced an absorbed dose rate of 1.5 Mrad per minute. The material was exposed to a series of irradiation cycles which were followed by aeration cycles. During both cycles the grinding device was kept running. After a number of such cycles the polytetrafluoroethylene was found to grind to powder at surprisingly low doses.

| Cycle | Condition of Ground Material | Cumulative Dose |
| --- | --- | --- |
| 1 | White flakes | 3 Mrads |
| 2 | White flakes | 6 Mrads |
| 3 | Flakes with some fines | 12 Mrads |
| 4 | Flakes with some fines and some visible powder | 24 Mrads |
| 5 | More loosely packed fines | 24 Mrads |
| 6 | Mixture of coarse fines and some powder | 30 Mrads |
| 7 | Powdered | 42 Mrads |
| 8 | Fine powder | 54 Mrads |

During the entire run, the polytetrafluoroethylene was contained within the grinding vessel. Although there were alternating cycles of aeration, heat was allowed to build up in the polymer. Although no direct temperature readings were made, 1 Mrad imparts $\sim 10°$ C. (18° F.) to polytetrafluoroethylene (specific heat 0.25) and since the aeration and irradiation portions of a cycle were equal, the polytetrafluoroethylene being ground could not dissipate all of the heat generated from irradiation. Temperatures in the range of 300° F. to 500° F. are estimated.

EXAMPLE 2

Using the same irradiation conditions as in Example 1, that is with the grinder positioned directly under an 800 KeV, 50 microamp beam, fine powders were made from previously sintered polytetrafluoroethylene. In these runs samples were taken after different exposure levels. Distinct aeration steps were not included in the cycles; reliance being had on the effects of ambient air during irradiation. The scrap was simultaneously irradiated and ground with no cooling.

| Dose | Sintered PTFE Condition of Material |
| --- | --- |
| 24 Mrads | Mixture of fine and coarse particles |
| 30 Mrads | Fine powder collecting on walls of vessel |
| 36 Mrads | Fewer coarse particles |
| 48 Mrads | Mostly powder; some coarse particles |
| 54 Mrads | Very fine powder |
| 66 Mrads | Very fine powder, less coarse particles |
| 78 Mrads | Very fine powder (about the same as 66 Mrads) |

Melt rheological tests were run on the sintered polytetrafluoroethylene which had been simultaneously ground to fine powder while being irradiated. Using a capillary rheometer, melt viscosities were determined at 330° C. (626° F.). Under these conditions high molecular weight, non-irradiated polytetrafluoroethylene does not flow.

| Material | Cumulative Dose | Apparent Melt Viscosity | Shear Rate |
| --- | --- | --- | --- |
| Sintered PTFE powder | 78 Mrads | 591 poises | 417 sec$^{-1}$ |
| (2 different samples) | | 401 poises | 1389 sec$^{-1}$ |

The two samples were subject to different temperatures for different lengths of time.

EXAMPLE 3

In an attempt to isolate the effects of irradiation from those of heat and grinding, previously sintered polytetrafluoroethylene chips were irradiated in air using a 3 MeV, 33 milliamp accelerator; a Dynamitron ® manufactured by Radiation Dynamics, Inc. Samples were taken at different intervals and then ground 30 seconds after each irradiation cycle. Dose was accumulated in 1.5 Mrad increments. After a 10 Mrad accumulation, material was ground and then allowed to cool for at least 10 minutes before receiving any additional exposure to irradiation. This experiment showed that exceedingly high doses were required to render sintered polytetrafluoroethylene grindable to fine powder when the polymer did not develop or retain any heat history; i.e. effectively was not heat treated.

|  | Dose | Sintered PTFE Condition of Ground Material |
|---|---|---|
| Series A | 30 Mrads | Chips - no effect |
|  | 40 Mrads | Chips - no effect |
|  | 50 Mrads | Chips - no effect |
|  | 60 Mrads | Chips - no effect |
|  | 70 Mrads | Chips - no effect |
| Series B |  |  |
|  | 100 Mrads | Chips - slight powder |
|  | 110 Mrads | Chips and some powder |
|  | 120 Mrads | Chips and some powder |
|  | 130 Mrads | Chips and some powder |
|  | 140 Mrads | Chips and some powder |
| Series C |  |  |
|  | 200 Mrads | Coarse powder, some fines |
|  | 210 Mrads | Powder, some coarse particles |
|  | 220 Mrads | Powder, fewer coarse particles |
|  | 230 Mrads | Powder, fewer coarse particles |
|  | 240 Mrads | Powder, fewer coarse particles |

Without concurrent heating, as in Examples 1 and 2, it took over 200 Mrads to mechanically reduce previously sintered polytetrafluoroethylene to a fine powder when the polymer was allowed to cool after irradiation steps. In no instance was fine powder produced in quantities that are considered economic yields. Not only weren't the yields in the above process not economic but the times involved were prohibitive. For instance if 240 Mrads were applied without interruption temperatures of 2400° F. would be generated in the material. At all times of course, the temperature must be held below the melting point of the polytetrafluoroethylene and thus cooling times between irradiation cycles are great, at least 10 minutes as stated above. Thus irradiation periods in excess of 7 hours were encountered.

EXAMPLE 4

Attempts were made to duplicate Example 1 using a 3.0 MeV electron beam accelerator. A larger blender was placed under the beam. A series of irradiation exposures were made concurrently grinding and irradiating previously sintered polytetrafluoroethylene. Each irradiation exposure was in 16 Mrad increments before polymer was inspected.

| Dose | Condition of Ground Material |
|---|---|
| 16 Mrads | No powder |
| 32 Mrads | Coarse pieces, no powder |
| 48 Mrads | Some fine powder |

This run was terminated because the heat build up in the polytetrafluoroethylene was sufficient to melt the plastic walls of the blender used in grinding.

EXAMPLE 5

To understand the influence of grinding while irradiating, two identical grinders or blenders were placed under the 3.0 MeV beam. One was set up with a commercial grinding blade capable of running at ~20,000 rpm. The second had paddle stirring blades and operated at only 68 rpm. Both blenders were filled with the same amount of previously sintered polytetrafluoroethylene. Irradiation was carried out in 4 Mrad increments. High speed grinding and simple stirring were both able to produce fine powdered polytetrafluoroethylene. As would be expected the higher speed grinding yielded a slightly finer powder.

|  | Condition of Ground Material | |
|---|---|---|
| Dose | High Speed | Low Speed |
| 20 Mrad | Slight powder | Slight powder |
| 52 Mrad | Significant powder | Significant powder |
| 80 Mrad | Less coarse powder | Slightly more coarse |

During both grinding operations the powder was very hot, probably between 200° C. and 250° C. (392° F. and 482° F.).

EXAMPLE 6

In order to better understand the factors influencing the irradiation degradation of previously sintered polytetrafluoroethylene, the experimental chamber used in Examples 1 and 2 was modified so that a controlled environment could be introduced into the grinder or blender. All trial runs were carried out using the 800 KeV 50 microamp electron beam accelerator with material being simultaneously irradiated and ground.

| Environment | Dose | Condition of Ground Material |
|---|---|---|
| Ambient air 45% RH | 80 Mrads | Fine powder |
| Moist oxygen 80% RH | 48 Mrads | Greasy powder (not as fine) |
|  | 80 Mrads | Fine powder |
| Moist nitrogen 76% RH | 80 Mrads | Could not be ground |

Thus air or oxygen must be present during the irradiation degradation of polytetrafluoroethylene.

EXAMPLE 7

Since the presence of heat and oxygen contributed to the irradiation degradation of polytetrafluoroethylene a series of experiments was run to determine if heating the polytetrafluoroethylene after irradiation could produce some of the beneficial effects observed from concurrently irradiating, heating and grinding polytetrafluoroethylene.

| Dose | Heat Treatment | Sintered PTFE Condition of Ground Material |
|---|---|---|
| 200 Mrads | None | Mixture of fine and coarse particles |
| 200 Mrads | 5 hours at 550° F. (288° C.) | Mixture of fine and some coarse particles. Notably less coarse particles than either of others in this example. |
| 50 Mrads | 1 hour at | Fine powder, some coarse particles. |

| Dose | Heat Treatment | Sintered PTFE Condition of Ground Material |
|---|---|---|
| | 550° F. (288° C.) | |

The fine and coarse particles from the 50 Mrad sintered polytetrafluoroethylene exposed for 1 hour at 550° F. (288° C.) were separated. Melt viscosity showed the fines were somewhat lower in molecular weight. Using a capillary rheometer at 330° C. (626° F.), these data were obtained:

| Sample | Shear Rate | Apparent Melt Viscosity |
|---|---|---|
| Coarse particles | 139 sec$^{-1}$ | 1940 poises |
| | 417 sec$^{-1}$ | 1225 poises |
| | 1389 sec$^{-1}$ | 735 poises |
| Fine particles | 139 sec$^{-1}$ | 491 poises |
| | 417 sec$^{-1}$ | 320 poises |
| | 1389 sec$^{-1}$ | 200 poises |

This data may reflect that grinding in a blender in itself separates the materials by molecular weight with the lower molecular weight (lower melt viscosity) polytetrafluoroethylene being easier to grind. It is apparent from this Example that irradiation and heating are not required to occur simultaneously, an important point since in commercial practice separation of the irradiation, heating and grinding operation may be desirable.

EXAMPLE 8

In all of the previous examples grinding of polytetrafluoroethylene was carried out in a blender-type grinder. Irradiation exposure in most cases was concurrent with grinding. Since it was shown in Example 7 that post heating of irradiated sintered polytetrafluoroethylene scrap could also produce low molecular weight polytetrafluoroethylene capable of being ground to fine powder, it was then possible to irradiate, then heat treat sintered polytetrafluoroethylene scrap and then subsequently grind it to powder using commercial, continuous grinding equipment. Using sintered polytetrafluoroethylene scrap, a series of runs was made using a Hammermill with a 0.027 inch round screen.

| Dose | Heat Treatment | Condition of Ground Material |
|---|---|---|
| 80 Mrads | 6 hours at 550° F. (288° C.) | Fine powder |
| 100 Mrads | 6 hours at 550° F. (288° C.) | Fine powder |
| 200 Mrads | 6 hours at 550° F. (288° C.) | Fine powder |
| 200 Mrads | None | Hard granular material, little powder |

EXAMPLE 9

Heretofore, all of the comparisons made on the grindability of irradiation degraded polytetrafluoroethylene have been based on visual observation and visual comparisons. To quantify the particle size of the various ground powders, these materials were subjected to analysis in a Coulter Counter manufactured by Coulter Electronics, Inc., Model No. TA-II, which is an electronic device capable of measuring particle size and plotting particle size distributions. Previously sintered polytetrafluoroethylene was irradiated to several doses, then heat treated and then ground in an air mill, Jet Pulverizer's Micro Master ®. The Hammermill relies on breaking down materials to fine powders by mechanically pounding large particles between metal plates and then allowing fine particles to pass through a screen. The air mill relies on large particles impinging upon themselves in a high turbulence air stream in order for the particles to break themselves down. It is generally believed that an air mill can produce finer powders than a Hammermill. Both of these techniques are commercial methods for producing powders.

| | | Coulter Counter Particles Size Percent | | | |
|---|---|---|---|---|---|
| Dose | Heat Treatment | Average | <2 micron | >30 micron | >60 micron |
| 80 Mrad | 6 hours at 550° F. (288° C.) | 6.4 microns | 3.0% | 2.5% | 0% |
| 100 Mrad | 6 hours at 550° F. (288° C.) | 6.6 microns | 4.0% | 7.5% | 5.0% |
| 200 Mrad | 6 hours at 550° F. (288° C.) | 4.7 microns | 8.0% | 4.0% | 2.0% |
| 250 Mrad | None | 5.1 microns | 7.0% | 5.0% | 1.5% |

All of these materials were processed at 3 pounds per hour using a 4 inch diameter air mill. From this data it can be clearly seen that a combination of moderate irradiation degradation (80 Mrads) when coupled with a heat treatment can produce grindable polytetrafluoroethylene from previously sintered scrap. Particle sizes comparable to ones obtained after very high exposures (250 Mrads) can be had. However, all samples had some large chunks (>64 microns) which were ignored by the Coulter counter.

EXAMPLE 10

To further characterize the influence of irradiation and heat treatment on the degradation of previously sintered polytetrafluoroethylene scrap, a series of materials were prepared at different doses and heat treatments. These were then ground in a 12 inch diameter air mill at a rate of 10 pounds per hour.

| | | Coulter Counter Particle Size Percent | | |
|---|---|---|---|---|
| Dose | Heat Treatment | Average | <2.0 μ | >60.0 μ |
| 60 Mrads | 6 hours at 550° F.(288° C.) | 4.7 microns | 10.0% | 4.0% |
| 80 Mrads | 6 hours at 550° F.(288° C.) | 4.4 microns | 10.0% | 4.0% |
| 100 Mrads | 6 hours at 550° F.(288° C.) | 4.8 microns | 8.0% | 1.0% |
| 60 Mrads | 1 hour at 550° F.(288° C.) | 6.7 microns | 6.0% | 5.0% |
| 100 Mrads | 1 hour at 550° F.(288° C.) | 6.3 microns | 8.0% | 2.0% |

It is apparent that over a moderate dose range, 60 through 100 Mrads, previously sintered polytetrafluoroethylene can be degraded and made grindable into fine powders when post heated for anywhere between 1 and 6 hours at an elevated temperature.

EXAMPLE 11

In order to more thoroughly understand the influence of irradiation dose and heat treatment on the degradation and grindability of previously sintered polytetrafluoroethylene scrap, a statistically designed experiment was run on two different lots of previously sintered polytetrafluoroethylene. This type of designed experiment is known as a central composite design for three independent variables. (See "Applications of Statistics to Experimentation" by J. S. Hunter, presented to the AICHE meeting Apr. 20-23, 1958.)

In this experiment, three parameters affecting the degradation of sintered polytetrafluoroethylene were allowed to vary:

| Independent Variables | Range |
|---|---|
| 1. Radiation dose | 0 to 115 Mrads |
| 2. Temperature of heat treatment | 100° F. to 600° F. (38° C. to 316° C.) |
| 3. Time at temperature | 1 hour to 6 hours |

This covers a broad, but practical range of irradiation dose, temperature of heat treatment and time for post-irradiation heat treatment.

Figure 1:
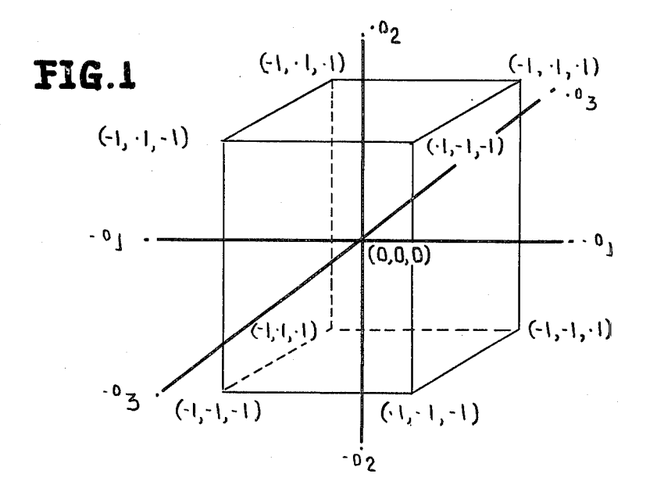
FIG. 1 illustrates the statistical design of an experiment performed on two different lots of previously sintered polytetrafluoroethylene.

The design for this type of experiment is illustrated in FIG. 1 of the accompanying drawings.

The three axial coordinates of the design represent the three independent variables. Design points are chosen at the extremes for each independent variable, the α points, and at levels equal to the mid-point level plus or minuses the range divided by 3.364, the points designated ±1, ±1, ±1. The center point, 0, 0, 0, is chosen as the mid-point of these practical ranges which yield desirable results in earlier experiments. In order to estimate experimental error so that only significant interactions or relationships between properties and compositions are reported, six center point replicates are used.

The dependent variables or tests performed on each material produced at the various combinations of dose, temperature and time at temperature were:

1. Melt flow rate—determined using a melt index tester at 330° C. (626° F.) with 2160 gram load. This temperature and load combination was found to give good results with polytetrafluoroethylene.
2. Average particle size—determined from Coulter Counter readings of particle size distribution.
3. Percent of particles less than 20 microns—determined from Coulter counter readings.
4. Percent of particles less than 75 microns—determined by weight percent which would pass through a 100 mesh screen. Since the Coulter counter can sometimes ignore or fail to take into its count very large particles, this alternate method of particle size determination was made.

All materials were irradiated to the prescribed dose using a 3 MeV electron beam accelerator. Materials were irradiated in air on open trays. After irradiation, test samples were placed in an air circulating laboratory oven capable of maintaning the desired temperature to ±1° C. Grinding to fine powders was accomplished using a 4 inch diameter air mill with a feed rate of 5 pounds per hour. In the following samples, Material A is pure sintered polytetrafluoroethylene scrap and Material B is sintered scrap polytetrafluoroethylene which had process oil incorporated therein to enhance its extrusion properties.

The tables below summarize the test conditions and data obtained.

TABLE I

| SINTERED PTFE - MATERIAL A | | | | | | | | |
|---|---|---|---|---|---|---|---|---|
| Design Matrix Position: | 111 | 11-1 | 1-11 | 1-1-1 | -111 | -11-1 | -1-11 | -1-1-1 |
| Independent Variables | | | | | | | | |
| Dose, in Mrads: | 90 | 90 | 90 | 90 | 25 | 25 | 25 | 25 |
| Temperature, °F.: | 500 | 500 | 200 | 200 | 500 | 500 | 200 | 200 |
| Time at temperature, hours: | 5 | 2 | 5 | 2 | 5 | 2 | 5 | 2 |
| Dependent Variables | | | | | | | | |
| Melt flow at 330° C.: | 154 | 1079 | 598 | 1162 | 17 | 0.02 | 0.7 | 3.0 |
| Average particle size, μ: | 15 | 6.1 | 8.6 | 16 | 21 | 19 | 14 | 17 |
| Percent <20 microns: | 67 | 87 | 86 | 62 | 47 | 55 | 70 | 61 |
| Percent <75 microns: (by screening) | 39 | 76 | 47 | 27 | 24 | 8 | 6 | 2 |

TABLE II

| SINTERED PTFE - MATERIAL A (Continued) | | | | | | |
|---|---|---|---|---|---|---|
| | Extreme Points | | | | | |
| Design Matrix Position: | +α,0,0 | −α, 0,0 | 0,+<,0 | 0,−α0 | 0,0,+α | 0,0,−α |
| Independent Variables | | | | | | |
| Dose, in Mrads: | 115 | 0 | 60 | 60 | 60 | 60 |
| Temperature, °F.: | 350 | 350 | 600 | 100 | 350 | 350 |
| Time at temperature, hours: | 3.5 | 3.5 | 3.5 | 3.5 | 6 | 1 |
| Dependent Variables | | | | | | |
| Melt flow at 330° C.: | 1783 | 0 | 176 | 239 | 215 | 61 |
| Average particle size, μ: | 14 | — | 11 | 13 | 21 | 20 |
| Percent <20 microns: | 64 | — | 74 | 71 | 48 | 50 |
| Percent <75 microns: (by screening) | 50 | — | 35 | 23 | 16 | 8 |

Point −α,0,0 with no irradiation did not flow in the melt flow test and could not be ground.

TABLE III

SINTERED PTFE - MATERIAL A (Continued)

| | Center Point Replicates | | | | | |
|---|---|---|---|---|---|---|
| Design Matrix Position: | 0,0,0 | 0,0,0 | 0,0,0 | 0,0,0 | 0,0,0 | 0,0,0 |
| Independent Variables: | | | | | | |
| Dose, in Mrads: | 60 | 60 | 60 | 60 | 60 | 60 |
| Temperature, °F.: | 350 | 350 | 350 | 350 | 350 | 350 |
| Time at temperature, hours: | 3.5 | 3.5 | 3.5 | 3.5 | 3.5 | 3.5 |
| Dependent Variables | | | | | | |
| Melt flow at 330° C.: | 193 | 80 | 215 | 159 | 188 | 268 |
| Average particle size, μ: | 16 | 15 | 13 | 21 | 12 | 17 |
| Percent <20 microns: | 61 | 67 | 73 | 49 | 81 | 62 |
| Percent <75 microns: (By screening) | 16 | 14 | 19 | 14 | 23 | 26 |

TABLE IV

SINTERED PTFE - MATERIAL B

| | Third Order Factorial Points | | | | | | | |
|---|---|---|---|---|---|---|---|---|
| Design Matrix Position: | 111 | 11-1 | 1-11 | 1-1-1 | -111 | -11-1 | -1-11 | -1-1-1 |
| Independent Variables | | | | | | | | |
| Dose, in Mrads: | 90 | 90 | 90 | 90 | 25 | 25 | 25 | 25 |
| Temperature, °F.: | 500 | 200 | 500 | 200 | 500 | 200 | 500 | 200 |
| Time at temperature, hours: | 5 | 2 | 5 | 2 | 5 | 2 | 5 | 2 |
| Dependent Variables | | | | | | | | |
| Melt flow at 330° C.: | 2136 | 141 | 978 | 993 | 51 | 2.2 | 0.5 | 3.3 |
| Average particle size, μ: | 9.6 | 7.6 | 9.0 | 9.8 | 18 | 19 | 17 | 24 |
| Percent <20 microns: | 82 | 78 | 83 | 87 | 59 | 56 | 62 | 42 |
| Percent <75 microns: (By screening) | 95 | 77 | 61 | 82 | 56 | 27 | 33 | 23 |

TABLE V

SINTERED PTFE - MATERIAL B (Continued)

| | Extreme Points | | | | | |
|---|---|---|---|---|---|---|
| Design Matrix Position: | +α,0,0 | −α,0,0 | 0,+α,0 | 0,−α,0 | 0,0,+α | 0,0,−α |
| Independent Variables | | | | | | |
| Dose, in Mrads: | 115 | 0 | 60 | 60 | 60 | 60 |
| Temperature, °F.: | 350 | 350 | 600 | 100 | 350 | 350 |
| Time at temperature, hours: | 3.5 | 3.5 | 3.5 | 3.5 | 6 | 1 |
| Dependent Variables | | | | | | |
| Melt flow at 330° C.: | 2130 | 0 | 5.4 | 91 | 51 | 158 |
| Average particle size, μ: | 11 | — | — | 14 | 19 | 26 |
| Percent <20 microns: | 72 | — | — | 76 | 52 | 38 |
| Percent <75 microns: (By screening) | 69 | — | — | 43 | 37 | 39 |

Point −α,0,0 with no irradiation did not flow in the melt flow test and could not be ground.
Point 0,+α,0 with high temperature exposure agglomerated in the oven and could not be fed to the grinder.

TABLE VI

SINTERED PTFE - MATERIAL B (Continued)

| | Center Point Replicates | | | | | |
|---|---|---|---|---|---|---|
| Design Matrix Position: | 0,0,0 | 0,0,0 | 0,0,0 | 0,0,0 | 0,0,0 | 0,0,0 |
| Independent Variables | | | | | | |
| Dose, in Mrads: | 60 | 60 | 60 | 60 | 60 | 60 |
| Temperature, °F.: | 350 | 350 | 350 | 350 | 350 | 350 |
| Time at temperature, hours: | 3.5 | 3.5 | 3.5 | 3.5 | 3.5 | 3.5 |
| Dependent Variables | | | | | | |
| Melt flow at 330° C.: | 72 | 230 | 179 | 152 | 157 | 145 |
| Average particle size, μ: | 21 | 20 | 19 | 12 | 13 | 18 |
| Percent <20 microns: | 48 | 50 | 54 | 71 | 78 | 59 |
| Percent <75 microns: (By screening) | 37 | 46 | 50 | 39 | 58 | 49 |

The data generated on each material was processed in a computer using step-wise multiple regression analysis. Such an analysis permits, on a statistical basis, a determination of the relative dependence of each of the dependent variables on the independent variables and on the interaction between two independent variables. The regression analysis also yields a correlation between each of the dependent variables thereby indicating whether one given test is closely related to another. For example:

TABLE VII

Material A - Inter-Relationship of Test Methods

Correlation Matrix Giving Correlation Coefficients

| | Melt Flow | Average Particle size | Percent <20μ | Percent <75μ |
|---|---|---|---|---|
| Melt Flow | 1.00 | | | |
| Average Particle Size | .41 | 1.00 | | |
| Percent <20μ | .33 | .96 | 1.00 | |
| Percent <75μ | .71 | .69 | .64 | 1.00 |

Material B - Inter-Relationship of Test Methods

Correlation of Matrix Giving Correlation Coefficients

| | Melt | Average Particle | Percent | Percent |

TABLE VII-continued

|  | Flow | size | <20μ | <75μ |
|---|---|---|---|---|
| Melt Flow | 1.00 | | | |
| Average Particle Size | .55 | 1.00 | | |
| Percent <20μ | .56 | .95 | 1.00 | |
| Percent <75μ | | | | |

From both sets of correlation coefficients, it can be seen that melt flow does not correlate well with the grindability of either material, especially in the ability to make fine powders. There is a stronger correlation (0.71 and 0.73) between melt flow and the ability to grind materials without producing large agglomerates or particle chunks which could not pass through a screen. There is a very high correlation between the two pieces of information gathered from Coulter counter curves on particle size distribution. This probably reflects the normalacy of the Coulter curves. There is only a fair correlation between particle data generated from the Coulter counter and that obtained by screening. This probably reflects the Coulter counter's neglect of very large agglomerates or particles, which screening does not.

More important, however, the regression analysis can be used to determine the relative dependence of each dependent variable or product property on the independent variables or process conditions. The greater the correlation between a statistical variation in a given property and a variation in a process condition, the more it can be said that said process condition controls or can be used to control a given property. Since the design of the process conditions (independent variables) used to produce low molecular weight, powdered polytetrafluoroethylene from previously sintered polytetrafluoroethylene was statistically based, the results and inferences from them cannot be ascribed to randon experimental behavior.

For each material, the step-wise regression analysis of the data from the central composite designed experiment, indicates the dependence of properties on process conditions. The information presented below demonstrates that irradiation alone cannot account for the degradation and grindability of previously sintered polytetrafluoroethylene. Exposure to temperatures at which polytetrafluoroethylene is normally considered stable accounts for some of the degradation and grindability of the previously sintered polytetrafluoroethylene.

TABLE VIII

SINTERED PTFE - MATERIAL A
Designed Experiment Step-Wise Regression Analysis

| Dependent Variables | Independent Variables - Process Conditions (Total Variance Explained) | | |
|---|---|---|---|
| Product Properties | Dominant Factor | Secondary Factor | Tertiary Factor |
| Melt Flow | Dose (77%) | Interaction of dose and time at temperature (87%) | Time at temperature (91%) |
| Average Particle Size | Dose (45%) | Time at temperature (66%) | Temperature (72%) |
| Percent <20 microns | Dose (31%) | Temperature (55%) | Time at temperature (63%) |
| Percent <75 microns (By screening) | Interaction of dose and temperature (60%) | Dose (69%) | Temperature (76%) |

TABLE IX

SINTERED PTFE - MATERIAL B
Designed Experiment Step-Wise Regression Analysis

| Dependent Variables | Independent Variables - Process Conditions (Total Variance Explained) | | |
|---|---|---|---|
| Product Properties | Dominant Factor | Secondary Factor | Tertiary Factor |
| Melt Flow | Dose (75%) | Interaction of dose and time at temperature (81%) | Temperature (86%) |
| Average Particle Size | Dose (55%) | Temperature (61%) | Time at temperature (65%) |
| Percent <20 microns | Dose (42%) | Interaction of dose and temperature (47%) | Time at temperature (52%) |
| Percent <75 microns (By screening) | Dose (63%) | Temperature (68%) | Interaction of temperature and time at temperature (71%) |

For both previously sintered polytetrafluoroethylene materials, the extent of irradiation dominates the degradation as indicated by increased melt flow and the ability to grind the degraded polytetrafluoroethylene into powders. However, in both cases heat treating plays a significant role. Heat treating irradiated polytetrafluoroethylene has considerable impact, especially with Material A, on the ability to grind these materials to fine powders. For Material A, irradiation only accounts for 45% of the variance in average particle size; whereas heat treating accounts for at least another 27% of the variance. This data clearly demonstrates a significant dependence of grindability on heat treating irradiated polytetrafluoroethylene which had been previously sintered.

Another way to indicate the relative dependence of the properties of irradiation degraded previously sintered polytetrafluoroethylene is to use the regression equations developed in the regression analysis in a contour plotting program. The accompanying FIGS. 2-7 plot properties such as melt flow and average particle size against coordinates of dose and heat treating conditions. The non-linearity of these plots further exemplifies the dependence of the properties of powdered, low molecular weight polytetrafluoroethylene on heat treatment as well as irradiation.

Figure 2:
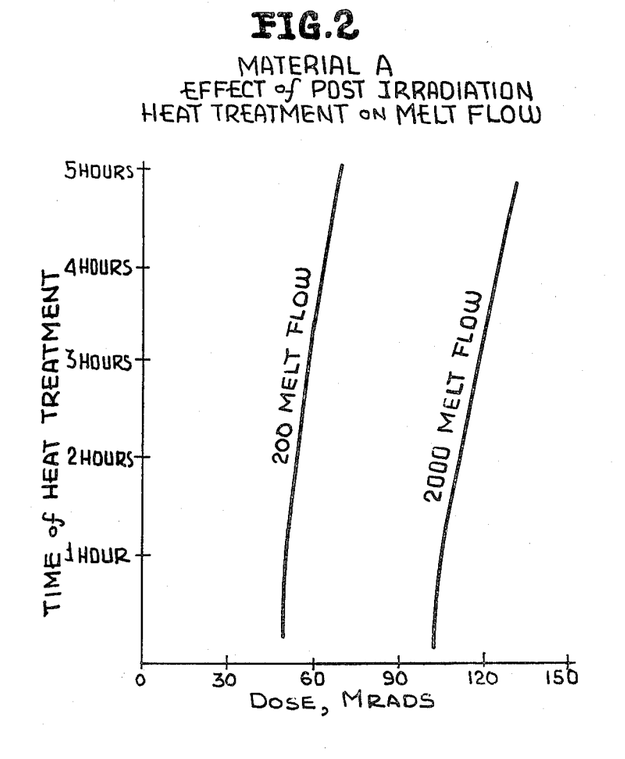
FIG. 2 is a plot of the effect of past irradiation heat treatment or melt flow of a first material.
Figure 3:
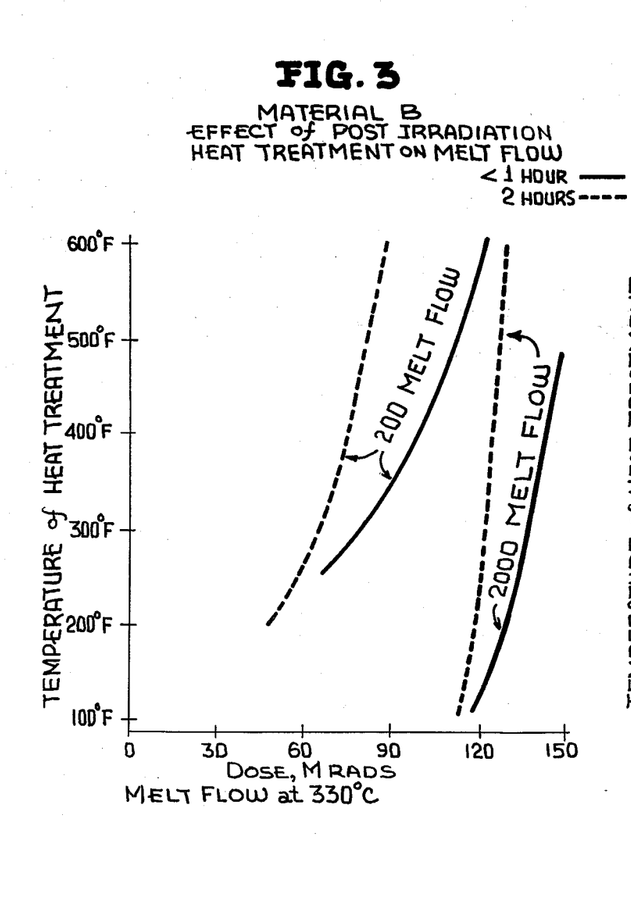
FIG. 3 is a plot of the effect of post irradiation heat treatment or melt flow of a second material.

FIGS. 2 and 3 for Materials A and B, respectively, illustrate the time and temperature dependence of the heat treatment cycle on increasing the melt flow of the lower molecular weight polytetrafluoroethylene. Both figures illustrate that as dose increases, there is a corresponding increase in melt flow or molecular weight degradation. FIG. 2 shows that heat treating may be more effective at somewhat modest temperatures such as 150° C. or 302° C.; a temperature considerably below the upper temperature use limits for polytetrafluoroethylene. At such temperatures polytetrafluoroethylene is normally considered quite stable.

Figure 4:
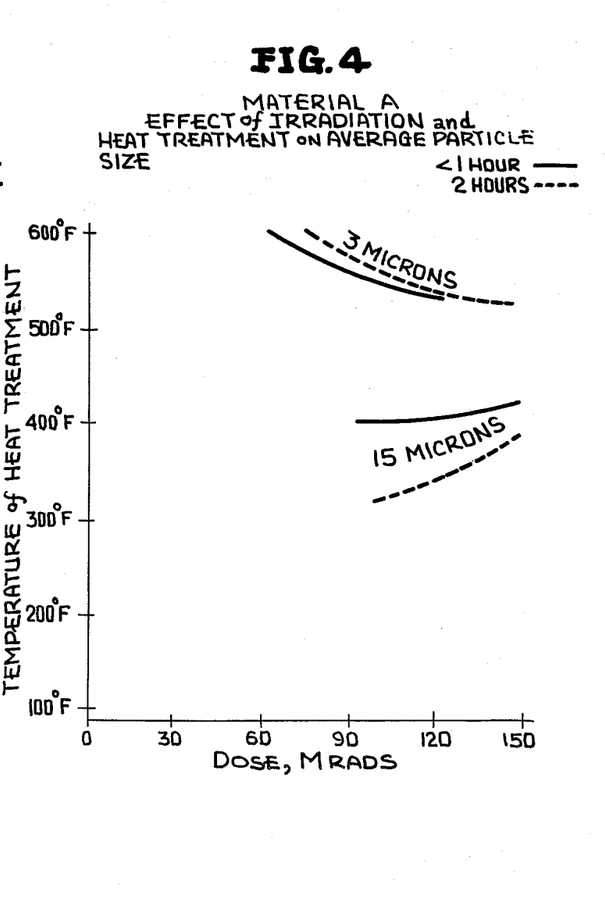
FIG. 4 is a plot of the effect of irradiation and heat treatment on average particle size of the first material.
Figure 5:
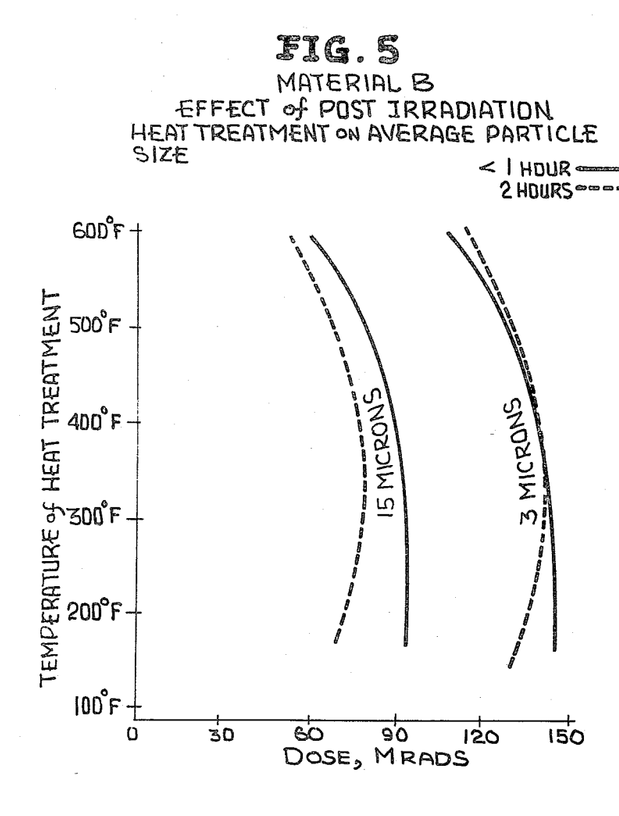
FIG. 5 is a plot of the effect or irradiation and heat treatment on average particle size of the second material.

On the other hand, FIGS. 4 and 5 for Materials A and B respectively, show that the longer the post irradiation heat treatment cycle the more difficult it is to produce fine particles. Less time at temperature should lead to finer particle materials. The higher the temperature of the heat treatment the easier it appears to grind the material to fine powders. These inferences call for different heat treatment conditions, preferably a short duration exposure at high temperatures, say at 288° C. or 550° F., to produce finer particles. Longer heat treatment even at lower temperatures was indicated to lower molecular weight and increase melt flow. As noted above melt flow and the ability to grind degraded polytetrafluoroethylene to fine powders are not that closely correlated.

Figure 6:
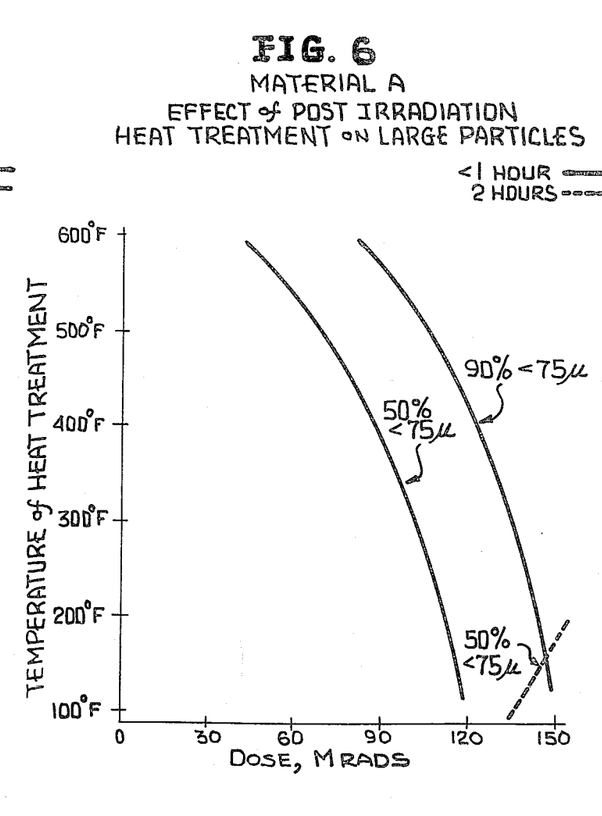
FIG. 6 is a plot of the effect of post irradiation heat treatment on large particles of the first material.
Figure 7:
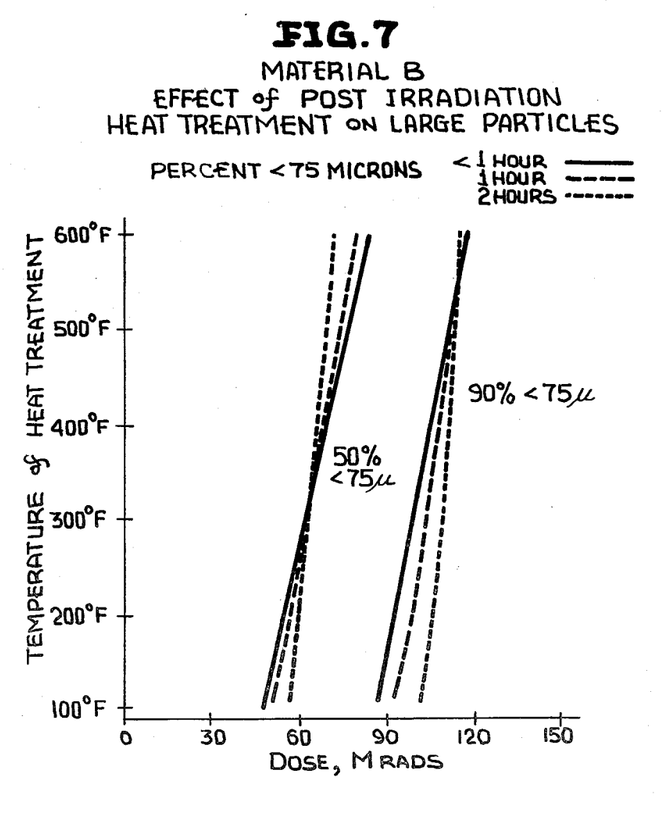
FIG. 7 is a plot of the effect of post irradiation heat treatment on large particles of the second material.

FIGS. 6 and 7 for materials A and B respectively indicate that to avoid large particles or particle agglomerates it is desirable to use minimum duration heat treatment at maximum temperature; bearing in mind, for example, that Material B fused when conditioned at 600° F. (316° C.) and could not then be fed to a grinder. For Material A (FIG. 6) higher temperatures yielded material free from large particles at lower doses. For Material B (FIG. 7) higher irradiation doses are indicated when using high temperatures to avoid large particles. These two figures are based on the extrapolation of data generated from screening the ground polytetrafluoroethylene for large particles, not on Coulter counter data.

Interpolating the information provided by these figures an optimum set of process conditions can be derived for the irradiation degradation and heat treatment of previously sintered polytetrafluoroethylene which is to be ground into fine powders. The duration and temperature of the heat treating cycle depends on the balance of particle size and molecular weight (melt flow) desired in a final product. It is apparent that post irradiation heat treatment is useful both in degrading previously sintered polytetrafluoroethylene and in rendering such material grindable into fine powders.

The mechanisms involved in rendered sintered polytetrafluoroethylene grindable into fine powders are not fully understood and the following attempt at explanation is not necessarily correct, but does appear to explain the observed facts.

The fact that a concurrent or post irradiation heat treatment of irradiated polytetrafluoroethylene is efficacious in reducing the molecular weight of polytetrafluoroethylene and in rendering it grindable is quite surprising. As noted hereinabove, polytetrafluoroethylene is well known for its thermal stability at the temperatures to which it was exposed during concurrent irradiation and grinding and during post-irradiation heat treatment. Since air and/or oxygen are needed for degradation of polytetrafluoroethylene, it would appear that while irradiation directly account for substantial degradation of polytetrafluoroethylene, it also produces oxidized or peroxidized polytetrafluorethylene. Such polytetrafluoroethylene and polytetrafluoroethylene with free radicals still present must exist for at least several hours after irradiation. Post irradiation heat treatment consumes these peroxidized or free radical species of polytetrafluoroethylene and leads to further molecular weight reduction. Such free radical and peroxidation reactions are time/temperature dependent and are accelerated by exposure to elevated temperatures. The morphology of crystalline polymers as polytetrafluoroethylene can also be affected by exposure to elevated temperatures below their melt transition. Thus, it would appear that the post-irradiation heat treatment of polytetrafluoroethylene and perhaps even the concurrent heating of polytetrafluoroethylele while irradiating could have effects similar to annealling of the polymer. Such annealling could toughen the low molecular weight polytetrafluoroethylene to make it more grindable. However, if carried too far the annealled low molecular weight polytetrafluoroethylene could become too tough for a commercial piece of grinding equipment to replace it to a fine powder. Thus, excessive annealling could lead to grindable material, having, however, excessive large particles which cannot be easily broken down.

In the complex irradiation and heating processes discussed, both irradiation and thermally excited degradation processes are taking place. At the same time morphological changes due to an annealling type phenomena are also probably occurring. A desirable product can be formed by taking advantage of these competing changes in the polytetrafluoroethylene. The process conditions needed to achieve this are indicated in the above examples.

Based on the above, doses between 50 and 150 Mrads appear to be useful. Heat treatment can take place either concurrent with irradiation or subsequent to irradiation. The preferred temperature range appears to be between 120° C. (248° F.) and 288° C. (550° F.). Slightly higher temperatures could be used but can pose problems of melting and agglomeration as they approach the melting point of sintered polytetrafluoroethylene (327° C. or 621° F.) scrap.

Time of heating is a factor which is determined not only by effects on particle size but also the time required to remove from the plastic by diffusion through the plastic, of free fluorene liberated during the irradiation cycle. At present this latter factor has somewhat restricted the lower limit of processing times although processing times of one-half hour are believed to be valid to accomplish sufficient treatment of sintered polytetrafluoroethylene to permit grinding to fine powders.

Athough the process of the present invention is discussed in terms of electron beam irradiation; other subatomic particle irradiation such as from Cobalt 60 may be utilized.

What is claimed is:

1. A process for rendering sintered polytetrafloroethylene capable of being ground to an average particle size of less than about 10 microns; the steps of which comprise:
  subjecting sintered polytetrafluoroethylene in the presence of air or oxygen to ionizing radiation in the range of about 50 megarads to about 200 megarads, and heating the sintered polytetrafluoroethylene in a range from about 150° F. to a temperature below the melting point of the material, said radiation being conducted at a dose rate and said heating being conducted for a period of time sufficient to render said sintered polytetrafluoroethylene capable of being ground to an average particle size of less than about 10 microns.

2. A process according to claim 1 wherein heating and irradiating occur simultaneously.

3. A process according to claim 1 further including grinding and wherein heating, irradiation and grinding occur simultaneously.

4. A process according to claim 1 wherein sintered polytetrafluoroethylene is irradiated and then heated before a material loss of peroxidized and free radical species of polytetrafluoroethylene occurs.

5. A process according to claim 1 wherein said temperature range is 248° F. to 550° F.

6. A process according to claim 5 wherein the sintered polytetrafluoroethylene is held at temperature for at least about 2 hours.

7. A process according to claim 1 wherein the dose is approximately 90 megarads, the temperature is 500° F. and the material is held at temperature from about 2 hours to about 5 hours.

8. A sintered polytetrafluoroethylene material that has been treated by the process of claim 1.

9. A sintered polytetrafluoroethylene material that has been treated by the process of claims 2 or 3.

10. A sintered polytetrafluoroethylene material that has been treated by the process of claim 4.

11. A sintered polytetrafluoroethylene material that has been treated by the process of claims 5 or 6.

12. A sintered polytetrafluoroethylene material that has been treated by the process of claim 7.

13. An article of commerce comprising sintered polytetrafluoroethylene that has been subjected in the presence of air or oxygen to ionizing radiation in the range of about 50 megarads to about 200 megarads and to temperatures in a range from about 150° F. to a temperature below the melting point of the material.

14. An article of commerce according to claim 13 capable of being ground to an average particle size of 10 microns or less.

15. An article of commerce according to claim 13 wherein said article is in particulate form having an average particle size of 10 microns or less.

16. A process according to claim 1 wherein said radiation is conducted in a plurality of stages, the cumulative dosage amount of which resides in the range of about 50-200 megarads.

17. A process according to claim 16 wherein said radiation and heating are conducted simultaneously and said plurality of stages are each conducted at a dosage and rate to maintain said temperature within said range for said sufficient period of time.

18. A process according to claim 16 which includes alternating stages of radiation and aeration to maintain said temperature within said range for said sufficient period of time.

19. A process according to claim 1 which further includes grinding said sintered polytetrafloroethylene to an average particle size of 10 microns or less.

* * * * *